United States Patent [19]

Miller

[11] 3,945,648

[45] Mar. 23, 1976

[54] FLUID TIGHT SEAL AND METHOD OF MAKING SAME

[75] Inventor: Edward A. Miller, Afton, Wyo.

[73] Assignee: Honeywell Inc., Minneapolis, Minn.

[22] Filed: Jan. 2, 1974

[21] Appl. No.: 429,495

[52] U.S. Cl. .............. 277/102; 264/249; 277/168; 277/204
[51] Int. Cl.² ................ F16J 15/10; F16L 21/04
[58] Field of Search .......... 277/204, 102, 110, 111, 277/112, 168, 188; 29/509; 264/249

[56] References Cited
UNITED STATES PATENTS

| | | | |
|---|---|---|---|
| 1,543,963 | 6/1925 | Walton | 277/204 |
| 2,339,479 | 1/1944 | McCreary | 277/204 |
| 2,676,823 | 4/1954 | Olson et al. | 277/204 |
| 2,819,919 | 1/1958 | Pearce et al. | 277/204 |
| 3,117,795 | 1/1964 | Price | 277/204 |
| 3,854,731 | 12/1974 | Gealt | 277/233 |

*Primary Examiner*—Richard E. Aegerter
*Assistant Examiner*—L. Footland
*Attorney, Agent, or Firm*—Arthur H. Swanson; Lockwood D. Burton; John Shaw Stevenson

[57] ABSTRACT

A resilient corrosion resistant multi-layered sealing ring member has a wrinkled outer peripheral sealing surface and a compressed, inner cylindrical wall portion. The method for forming this ring comprises wrapping a number of layers of a readily deformable plastic tape on a tube and employing a clamping member that is slidable in a telescopic manner on the tube to compress several of the outer layers of the plastic tape to substantially reduce their axial dimension and thereby form a seal between the clamping member and the tube.

1 Claim, 3 Drawing Figures

FLUID TIGHT SEAL AND METHOD OF MAKING SAME

CROSS REFERENCE TO RELATED APPLICATION

The present invention comprises an improvement over copending application application of Arthur E. Gealt, U.S. Patent now U.S. Pat. No. 3,854,731 filed Feb. 5, 1973.

BACKGROUND OF THE INVENTION

1. Field of the Invention

The present invention relates to an improved seal for fluid tight joints and a method of making the same and may be of the type generally classified in the U.S. Patent Office with joint packing, wedging portions, Class 277, Sub-class 190. The improved apparatus or seal is particularly useful for providing a corrosion resistant, fluid tight joint between tubular members having different coefficients of thermal expansion and which are exposed to ambient temperature changes in a corrosive environment.

2. Description of the Prior Art

O-ring seals made of tetrafluorethylene have been employed to provide corrosion resistant fluid tight joints between members having different coefficients of thermal expansion. Such seals however have not provided entirely satisfactory fluid tight sealing joints because of their inherently stiff and smooth peripheral surfaces. O-rings which are made of more deformable materials such as natural rubber or synthetic rubber, and which provide better sealing surfaces have been unsatisfactory because of their inability to resist the corrosive effects of the environment. Corrosion resistant epoxy bonding materials have also been employed but are unsatisfactory because of their inability to withstand, without cracking and leaking, the ambient temperature changes to which the fluid tight joint is exposed. More recently a seal has been made which overcomes some of the aforementioned deficiencies by first wrapping several layers of a deformable plastic tape on a mandrel, mounting a pair of sliding dies on the mandrel on opposite sides of the tape, moving the dies toward one another to effect the compression of ends of the tape into a laminated sealing ring member and then assembling the compressed seal as a sealing ring between two annular members. This type of fluid tight seal and method of making same is disclosed in the above referenced Arthur E. Gealt U.S. Pat. No. 3,854,731.

The aforementioned construction is an improvement over the prior art methods that have previously been employed to make fluid tight seals. However, the numerous steps of manufacturing required e.g., to wrap layers of plastic tape upon a mandrel, to compress the ends of the tape on the mandrel into an annular sealing ring, to remove the ring from the mandrel and mount it as a sealing ring between two annular members has been found to be too costly. When such a seal is retained by a clamping ring and a glass tube of a prescribed size, such a seal will satisfactorily seal a joint formed between the clamping ring and the glass tube. However, when such an annular sealing ring is mounted between two annular plastic members and the space between these members into which the sealing ring is applied is greater than the normal amount of space for which the sealing ring was designed, as occurs with normal tolerances, there is a potential for the joint formed by that sealing ring to leak. Such leakage occurs because those plastic members have a tendency to creep, especially when they are subjected to temperature cycles.

SUMMARY OF THE INVENTION

In accordance with the present invention, there is provided a resilient corrosion resistant, multi-layered sealing ring having a wrinkled sealing surface and a method for forming such sealing ring directly on one of two annular parts that are to be brought into fluid tight sealed engagement with one another. A feature of the present invention is that the compression seal is formed in situ on the very apparatus to which the seal is applied. For example, in the art relating to sensors for detecting various parameters of a fluid, such as pH., the sensor includes a thin-walled glass tube carried in a suitable base material. Because these sensors are designed to be immersed in a fluid to be monitored, the seals used in such sensors must be capable of protecting the sensor within the glass tube and, themselves be chemically inert with respect to the sometimes very corrosive fluid into which the sensor is immersed. The method comprises the steps of first wrapping a preselected number of layers of a readily deformable thin plastic tape on a first annular part such as a tube, and second, axially compressing several of the outer most layers of tape to the desired axial dimension of the sealing ring and trimming any of the compressed tape material that is in excess of that quantity which is required to make the desired fluid tight seal.

Apparatus suitable for effecting such a compression comprises a sleeve shaped stop member having one end positioned to engage one end of the wrapped tape that surrounds an annular portion of the tube. This sleeve-shaped stop member is retained in a fixed, spaced apart, relationship from the outer surface of the tube by an epoxy cement material. A clamping ring is mounted for slidable movement along another annular portion of the tube and toward the opposite end of the wrapped tape. When the clamping ring is forcefully slid along the tube toward the sleeve shaped stop member, several of the outermost layers of the tape with which the stop and the ring are then engaged will be compressed and formed into a compact laminated sealing ring member having a wrinkled outer peripheral surface and an inner cylindrically shaped portion extending from opposite ends thereof. This compacted sealing ring will completely fill the space between the annular members and will be held in compressed relationship therein.

BRIEF DESCRIPTION OF THE DRAWING

A better understanding of the present invention may be had when the following detailed description is read in connection with the accompanying drawing in which.

DESCRIPTION OF THE PREFERRED EMBODIMENT

Figure 1:
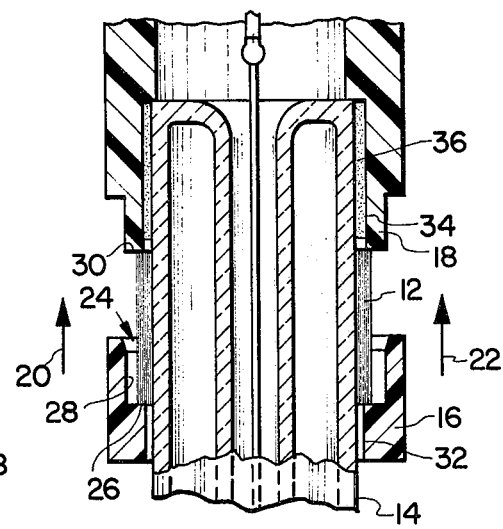
FIG. 1 shows a tape in the form of a ring wrapped about a tube and a sliding clamping ring mounted on the tube for compressing the outer edges of the tape into a sealing ring.

As illustrated in FIG. 1, the first step used in making the sealing ring of this invention, a ring 10; is formed by wrapping a preselected number of layers of a thin plastic tape 12 comprised of a readily deformable corrosive resistant material in a spiral fashion on a cylindrically shaped tube 14.

The second step in producing the sealing ring 10, as indicated in FIG. 1, is to move a clamping ring, or gland, 16 in an axial direction toward the lower lip of the member 18 in the direction indicated by the arrows 20, 22. The ring, or gland, 16 has an annular recess 24 formed by an annular face portion or inwardly extending shoulder 26 and a cylindrical wall or collar portion 28. The inner periphery of the shoulder 26 is arranged to fit relatively closely about the tube 14. While the fit is relatively close, normal manufacturing tolerances allows for some looseness. Accordingly, the face of the shoulder 26 engages at least several of the outer layers of the tape 12. The sleeve member 18 is shown having a lower end 30 in engagement with the ends of several of the outer layers of the tape 12.

The ring 16 and the sleeve member 18 have inner walls 32 and 34. The wall 32 of ring 16 is mounted in sliding contact as shown with the lower end portion of the tube 14. The wall 34 of the member 18 is fixedly connected and sealed to the outer wall of the tube 14 as by means of an epoxy material 36.

Figure 3:
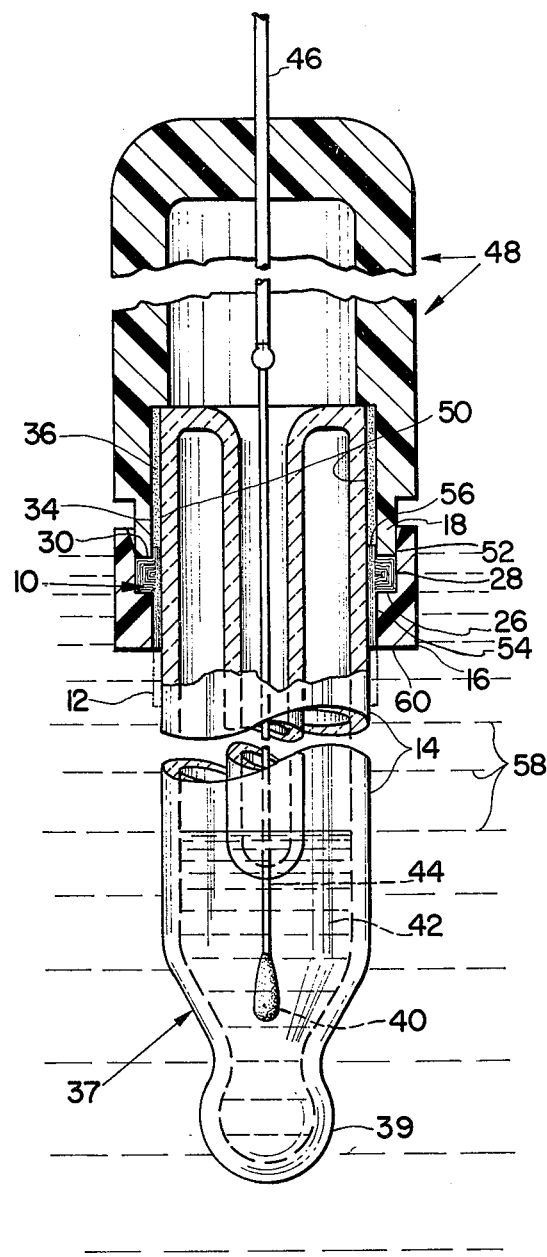
FIG. 3 shows how the sealing ring of FIG. 2 can be formed directly between two annular members, e.g., a tube containing by way of an example, a pH sensor and a cap that surrounds an open end of the tube.
Figure 2:
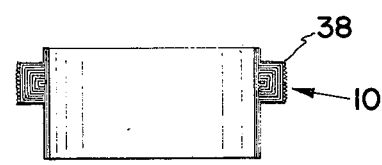
FIG. 2 shows the sealing ring that is formed by forcing the clamping ring in the direction of the arrows shown in FIG. 1

As the clamping ring, or gland, 16 is moved toward the sleeve member 18, the shoulder portion 26 of ring 16 will cause the outer layers of tape 12 to be compressed into a shape conforming to the space between the ring 16, the lip 18 and the tube 14 as shown in FIGS. 2 and 3. When the ring 16 has been moved sufficiently to complete the compression of the sealing tape 12, the ring 16 may and preferably is cemented in place, as shown in FIG. 3, to provide mechanical protection for the seal 10.

The tape 12 is preferably made of tetrafluorethylene. Other equivalent materials possessing similar sealing characteristics as tetrafluorethylene may be employed.

It should be readily understood that the length and width of the tape 12 required to produce a suitable seal according to this invention will vary with the size of the fluid tight joint to be sealed. The annular gap to be filled by the sealing ring 10 in a fluid tight joint is a function of the difference in diameters of the annular parts between which the seal 10 is employed to form a fluid tight joint. By way of an example, it has been found that a tape 12 that is one half inch wide, 0.003 inches thick and 22 inches long that is spirally wound six turns on itself about the tube 14 will result, when compressed as described, in an ideal ring seal 10 whose inside diameter will be 0.687 inches and whose thickness will be 0.103 inches plus or minus 0.020 inches.

As each layer of the tape is wrapped on the tube 14 it will remain in its wrapped position due to the inherent electro-static charge that is created between these layers during the wrapping operation. Thus no means is required to retain the tape on the tube 14 in its wrapped condition.

The general configuration of the sealing ring 10 is shown in FIG. 2. While not shown in FIG. 2, the inner annular surface portion of the sealing ring 10 has a laminar construction, and is formed of a plurality of overlapping compressed layers of the tape. The previously mentioned remaining outer annular layers of the sealing ring 10, as may be seen in FIG. 2, comprises a resilient wrinkled sealing surface 38.

The aforementioned seal 10 can be employed in a beneficial manner, as shown in FIG. 3, in a conventional pH measuring cell 37. This cell 37 is comprised of a cylindrical glass tube 14 having a bulbous ion sensitive end 39. A fused cell containing a potassium chloride and sodium chloride electrode 40 is mounted within the tube 14 which also contains an ion exchange liquid or electrolyte 42. The electrical wire connection 44 extends in an upward direction in the tube 14 from the electrode 40. The extension wire 46 connects the electrical wire 44 to a pH indicating recording device, not shown.

The sleeve member 18 of FIG. 1 is the lower open end portion of the cap 48 in FIG. 3. This cap 48 which is preferably made of a plastic material, e.g., glass filled polysulfone, (as is the clamping ring 16) is mounted on and covers the upper cylindrical end portion 50 of the tube 14. A space is formed between the inner wall 34 of the sleeve part 18 of the cap 48 and the outer wall portion of the tube 14 into which a cement-like material such as a flexible epoxy 36 is poured and hardened. This epoxy retains the inner wall of the cap 48 and the outer wall portion 50 of the tube 14 in a desired fixed, spaced apart, aligned relationship with one another so the fluid tight sealing ring 10 can readily be assembled in the position shown in FIG. 3. Although the flexible epoxy forms a fluid tight seal between the sleeve surface 34 and the tube surface 50 and comprises the principal seal between the glass tube 14 and the cap 48, it is not inert with respect so some of the corrosive fluids 58 into which the glass tube 14 may be immersed. It therefore may be attacked and deteriorate and thereby loose its ability to act as a fluid tight seal. Accordingly, the compression seal of the present invention comprises a secondary seal, the main function of which is to protect the primary or epoxy seal.

Several layers of the tape 12 are then wrapped about tube 14 in the manner shown in FIG. 1. The clamping ring 16 is then moved in an upward direction from the position shown in FIG. 1 to the position shown in FIG. 3.

While the clamping ring 16 is being pressed upwardly in sliding engagement along surface 52 with the sleeve shaped stop portion 18 of the cap 48, a number of the outer layers of tape 12 will be forced into the position shown for the seal 10 in FIG. 3. In that position, the sealing ring 10 will form a resilient corrosion resistant, multi-layered, fluid tight seal between the outer cylindrical wall surface 50 of the glass tube 14 and the inner surfaces 28, 26 of the clamping ring 16 which form the annular recess 24 therein. Sealing ring 10 will also be retained in fluid tight contact with the lower end surface 30 of the sleeve shaped stop member 18. The sealing ring 10 will thus provide a fluid tight seal between the outer surface 50 of the glass tube 14 and the lower inner annular surface 54 of the clamping ring 16. This sealing ring 10 will also provide a fluid tight seal between the outer surface 50 of the glass tube 14 and the lower most part of the annular wall 34 that is below the lower end 56 of the epoxy. The sealing ring 10 will therefore be positioned to prevent a liquid 58, the pH of which is to be measured and which surrounds the glass tube 14, from entering the tube 14 and contaminating the electrolyte 42.

Any of the excess sealing material, formed by the outer layers of the tape 12, which is forced out of the lower end 60 of the ring 16 and any of the inner layers of tape 12 that remains on the tube 14 below the base 60 of the clamping ring 16, such as is shown in in phantom line in FIG. 3, is trimmed from the outer surface 50 of the tube 16.

The shape of the outer wall 50 of the tube 14 which is employed is not limited to the cylindrical shape as shown in FIG. 1 but can be made of a square, rectangular or any one of many other desired shapes. The shape that is selected for the ring 16 will depend on the shape of the respective outer and inner wall parts between which the sealing ring 10 is required to form a resilient corrosive-resistant fluid tight joint.

The aforementioned described sealing ring will provide an improved fluid tight joint because:

a. The outer layers of the resilient sealing tape 12 when compressed in the aforementioned manner by the clamping ring 16 into the seal 10 will be more effective than prior known seals to seal any crevices that may be present in the cap 48, in the clamping ring 16 or in the outer peripheral portion on the glass tubing 36 inasmuch as the seal is formed in situ. The manner of sealing presented herein is effective to completely fill the space or interstices between the recess 24 in the clamping ring 16 and to thereafter cause additional sealing portions of this tape 12 to be forced, due to the cold flow characteristics of the sealant, out of the recess 24 and into contact with the surfaces to be sealed even under a condition of maximum tolerance deviation.

b. This sealing ring 10 is chemically inert with respect to the corrosive fluids to which it may be exposed.

c. The resilient, thin, multi-layered wrinkled construction of the sealing ring 10 enables it to provide a fluid tight seal even when the glass tube 14, cap 48 and the clamping ring 16, which forms the area in which the sealing ring 10 is confined, have different temperature coefficient of expansion and are exposed to widely varying temperature changes taking place in their environment.

The embodiment of the invention in which an exclusive property or privilege is claimed are defined as follows:

1. A seal assembly, comprising a T-shaped sealing ring, a cylindrical member, an annular member and an annular gland member, said sealing ring comprising a preselected number of layers of a readily deformable plastic tape wrapped about the said cylindrical member, said annular member having a portion thereof connected to said cylindrical member a sleeve forming an open end portion of said annular member and being in spaced relationship about said cylindrical member, the said outer open end of said sleeve being in abutting contact with one end of several of the outer layers of said tape, said annular gland member being positioned in spaced apart relationship about said cylindrical member and having a portion thereof in slidable contact with an outer surface of the annular sleeve, said annular gland member having an end thereof in compressed contact with the other end of said several outer layers of said tape and forming a vertical portion of said T-shaped sealing ring, the base of said vertical portion being of a multi-wrinkle construction and in fluid tight engagement with said gland member, portions of said compressed plastic tape extending into and filling the annular space between said open end portion of the annular sleeve member and said cylindrical member, and said annular space that is between the remaining portion of the gland and the cylindrical member to thereby form a cross bar portion of said T-shaped sealing ring.

* * * * *